US012780287B2

(12) United States Patent
Abuaita et al.

(10) Patent No.: US 12,780,287 B2
(45) Date of Patent: Nov. 3, 2026

(54) STEERING WHEEL OSCILLATION PREVENTION DURING VEHICLE SHUTDOWN

(71) Applicant: GM GLOBAL TECHNOLOGY OPERATIONS LLC, Detroit, MI (US)

(72) Inventors: Raed Nasim Abuaita, Fenton, MI (US); Jason W. Gaydos, Waterford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 69 days.

(21) Appl. No.: 18/917,078

(22) Filed: Oct. 16, 2024

(65) Prior Publication Data

US 2026/0103230 A1 Apr. 16, 2026

(51) Int. Cl.
*B62D 1/184* (2006.01)
*B62D 5/04* (2006.01)

(52) U.S. Cl.
CPC ........... *B62D 1/184* (2013.01); *B62D 5/0409* (2013.01); *B62D 5/046* (2013.01)

(58) Field of Classification Search
CPC ....... B62D 1/184; B62D 5/0409; B62D 5/046
See application file for complete search history.

(56) References Cited

U.S. PATENT DOCUMENTS

2014/0352468 A1* 12/2014 Kim ..................... B62D 5/0409
74/409
2018/0362075 A1* 12/2018 Lee ..................... B62D 5/0421
2020/0239061 A1* 7/2020 Zheng .................... B62D 5/046
2023/0009437 A1* 1/2023 Ko ....................... B60R 25/0215
2023/0303156 A1* 9/2023 Lee ........................ B62D 5/046
2024/0367713 A1* 11/2024 Lee ......................... B62D 5/04
2025/0058821 A1* 2/2025 Friedel .................. B62D 5/046

FOREIGN PATENT DOCUMENTS

DE 102004020513 A1 11/2005
DE 102014007939 A1 12/2014
DE 102018114594 A1 12/2018
DE 102020100789 A1 7/2020
DE 102022200268 A1 7/2023
WO WO-2023134964 A1 7/2023

OTHER PUBLICATIONS

German Office Action from counterpart DE1020241358556, dated Jul. 8, 2025.

* cited by examiner

*Primary Examiner* — Carl C Staubach

(57) ABSTRACT

An electronic power steering system is disclosed and includes: a steering wheel configured to steer a host vehicle; a steering column connected to the steering wheel; a rack; an electronic column lock configured to lock the steering column to the rack; and a control module configured, during a shutdown event of the host vehicle, to determine whether the electronic column lock is active and has locked the steering column to the rack, and, in response to determining that the steering column is locked to the rack, dampen movement of the steering wheel to prevent movement of the steering wheel.

18 Claims, 5 Drawing Sheets

STEERING WHEEL OSCILLATION PREVENTION DURING VEHICLE SHUTDOWN

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle steering systems, and more particularly, to systems for preventing steering oscillation during vehicle shutdown.

A steering system of a vehicle can include a steering wheel, a steering column, an electronic power steering (EPS) motor, an intermediate shaft, universal joints, a rack and pinion, tie rods, and other componentry, which are connected to control arms and steering knuckles of the front wheels of the vehicle. An EPS controller controls power provided to the EPS motor when assisting in steering the front wheels. The amount of assistance can be based, for example, on the speed of the vehicle, steering torque, and steering angle.

SUMMARY

An electronic power steering system is disclosed and includes: a steering wheel configured to steer a host vehicle; a steering column connected to the steering wheel; a rack; an electronic column lock configured to lock the steering column to the rack; and a control module configured, during a shutdown event of the host vehicle, to determine whether the electronic column lock is active and has locked the steering column to the rack, and, in response to determining that the steering column is locked to the rack, dampen movement of the steering wheel to prevent movement of the steering wheel.

In other features, the control module is configured, during the shutdown event of the host vehicle, to determine whether the host vehicle is stationary and whether the host vehicle is turned off, and, based on the host vehicle being stationary and being turned off, dampen movement of the steering wheel.

In other features, the control module is configured, during the shutdown event of the host vehicle, to determine whether the host vehicle is in a parked state, and, based on the host vehicle being in a parked state, dampen movement of the steering wheel.

In other features, the control module is configured, while damping movement of the steering wheel, to short phases of an electronic power steering system motor of the host vehicle to a ground reference terminal.

In other features, the electronic power steering system further includes the electronic power steering system motor. The control module is configured to, in response to determining that the steering column is locked to the rack, dampen movement of a shaft of the electronic power steering motor including increasing resistance to prevent movement of the shaft.

In other features, the electronic power steering system further includes an electronic power steering control circuit including a first switch and a second switch. The first switch and the second switch are connected in series between a power source terminal and the ground reference terminal. A terminal between the first switch and the second switch supplies power to the electronic power steering system motor. The control module is configured to, while damping movement of the steering wheel, to open the first switch and close the second switch.

In other features, the control module is configured to i) determine that the vehicle is in a driving mode, and ii) transmit a command to the electronic power steering control circuit to electrically couple each of phases of the electronic power steering system motor to a power source to free the steering wheel including changing states of the first switch and the second switch.

In other features, the first switch and the second switch are implemented as metal-oxide-semiconductor field-effect transistors or relays.

In other features, the control module is configured, while damping movement of the steering wheel, to control an electronic power steering system motor to apply a torque that counters and cancels motion of the steering wheel thereby preventing motion of the steering wheel.

In other features, the control module is configured, while damping movement of the steering wheel, to implement a steering damping function to resist and restrain movement of a shaft of an electronic power steering motor.

In other features, the control module is configured, while damping movement of the steering wheel, to command motor torque to match a target motor torque to minimize or eliminate error between the commanded motor torque and the target motor torque.

In other features, the control module is configured to implement a proportional-integral-derivative process to generate the commanded motor torque.

In other features, an electronic power steering system method for a host vehicle is disclosed. The host vehicle includes a steering wheel, a steering column connected to the steering wheel, a rack, and an electronic column lock configured to lock the steering column to the rack. The method includes: during a shutdown event of the host vehicle, determining whether the electronic column lock is active and has locked the steering column to the rack; and in response to determining that the steering column is locked to the rack, damping movement of the steering wheel to prevent movement of the steering wheel.

In other features, the method further includes: during the shutdown event of the host vehicle, determining whether the host vehicle is stationary and whether the host vehicle is turned off; and based on the host vehicle being stationary and being turned off, damping movement of the steering wheel.

In other features, the method further includes: during the shutdown event of the host vehicle, determining whether the host vehicle is in a parked state; and based on the host vehicle being in a parked state, damping movement of the steering wheel.

In other features, the method further includes, while damping movement of the steering wheel, shorting phases of an electronic power steering system motor of the host vehicle to a ground reference terminal.

In other features, the method further includes: supplying power to the electronic power steering system motor via a first switch and a second switch, where the first switch and the second switch are connected in series between a power source terminal and the ground reference terminal, and where a terminal between the first switch and the second switch supplies power to the electronic power steering system motor; and while damping movement of the steering wheel, opening the first switch and closing the second switch.

In other features, the method further includes, while damping movement of the steering wheel, controlling an electronic power steering system motor to apply a torque that counters and cancels motion of the steering wheel thereby preventing motion of the steering wheel.

In other features, the method further includes, while damping movement of the steering wheel, commanding motor torque to match a target motor torque to minimize or eliminate error between the commanded motor torque and the target motor torque.

In other features, the method further includes implementing a proportional-integral-derivative process to generate the commanded motor torque.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
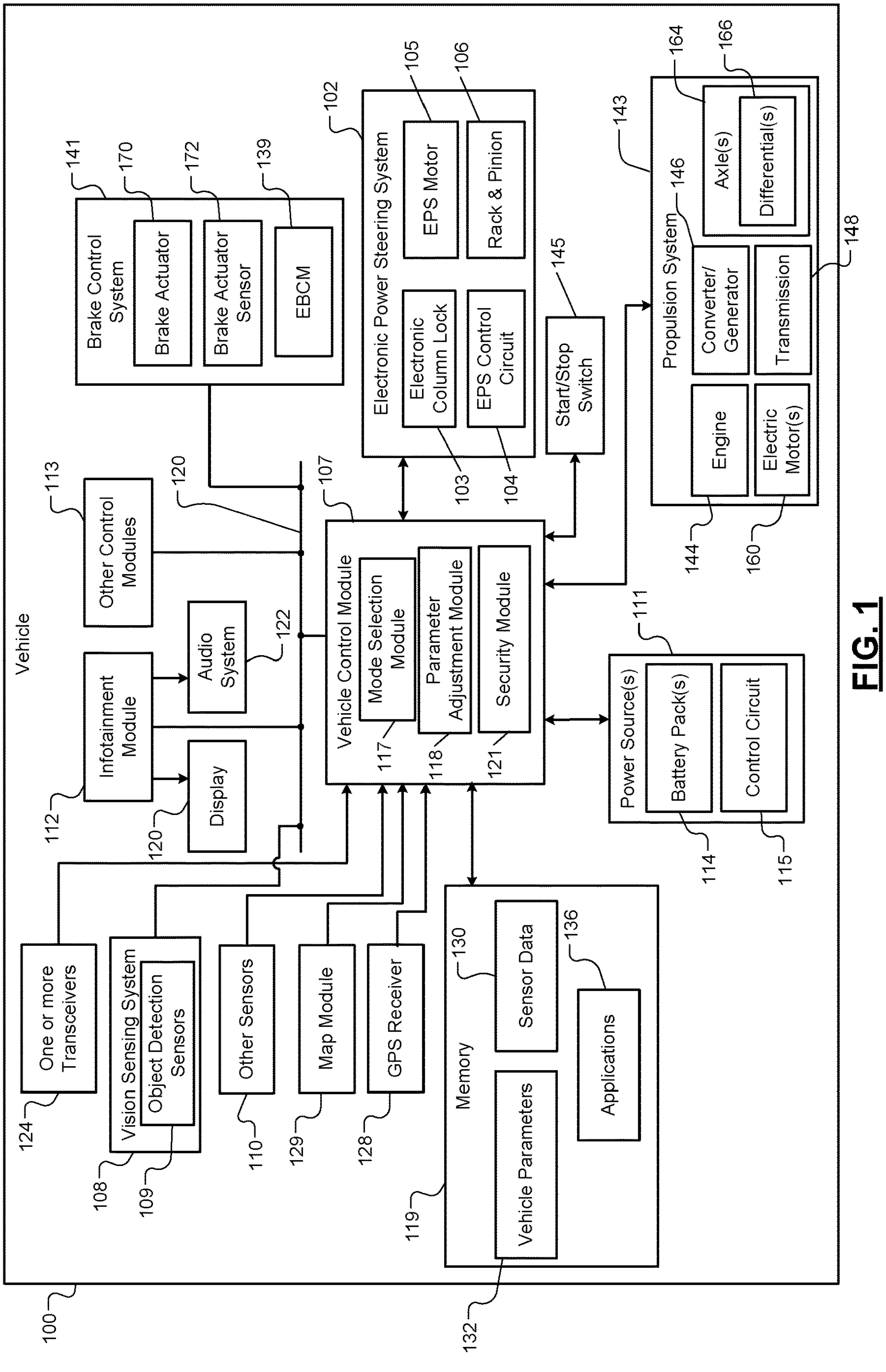
FIG. 1 is a functional block diagram of a vehicle including an example EPS system in accordance with the present disclosure.

A steering system of a host vehicle can include an electronic steering column lock. The electronic steering column lock is used to lock a steering column to an intermediate shaft to prevent movement of the steering wheel when the vehicle is turned off. When the steering wheel column is locked, there can be a small amount of "play" between the steering wheel and steering rack such that the steering wheel and steering column are able to rotate a small amount, for example, up to 5°). The steering column may be locked when the vehicle is stationary, a transmission of the vehicle is in a parked position, and the vehicle is turned off.

During a vehicle shutdown event, a start/stop button may be pressed by a vehicle driver and/or a driver door may be opened and the vehicle begins to shut down. The opening of the driver door in, for example, an electric vehicle may begin a shutdown procedure. The shutting off of a vehicle may include, for example, turning off an ignition system and electronics in the case of a vehicle with an internal combustion engine or simply shutting off vehicle electronics in the case of an electric vehicle. During the shutdown event, a steering column is locked and an EPS system transitions from providing power assisted steering to no longer providing power assisted steering. The amount of steering assistance may be ramped down from 100% assistance to 0% assistance. If during this ramp down process the steering wheel of the vehicle is bumped, the steering wheel may oscillate depending on the vehicle steering system, the amount of stored energy in the steering system, etc. This occurs when the steering column is locked. The amount of movement of the steering wheel during the oscillation event is within the amount of play (0-5° of angular movement) in the steering wheel. The oscillation stops when the assisted steering has completed the ramp out process. The later in the ramp out process the steering wheel is bumped, the shorter the duration of the steering wheel oscillation.

The examples set forth herein include an EPS system that provides steering wheel damping to prevent steering oscillation during shutdown. In an embodiment, the EPS system controls front steering during a vehicle shutdown event to mitigate instabilities and/or oscillations of the steering wheel when a steering wheel column is locked. The EPS system includes algorithms to determine scenarios of when to control steering wheel movement under certain vehicle conditions by mitigating instabilities induced by interactions between the EPS system and a driver during vehicle shutdown. The EPS system includes sensors and circuitry for fast detection of conditions when the vehicle is stationary and during a vehicle shutdown event to determine when to electronically control and stabilize the EPS system.

In an embodiment, the EPS system includes an EPS circuit that is configured to control electronic switching to create high resistance and damping force to hold a front steering rack actuator (or EPS motor) in a current position by disconnecting a power source and shorting EPS motor phases to a ground reference. The effect of shorting the EPS motor phases to ground results in the EPS motor generating a resistive torque to resist rotational movement of the steering wheel. This effect in conjunction with the steering system ratio between the steering wheel and front steering rack actuator provides more robust controllability of steering wheel movement.

In another embodiment, a unique steering damping function is implemented to resist and restrain undesired movement of a shaft of the EPS motor during a vehicle shutdown event and during implementation of a steering assist ramp out process. In yet another embodiment, a proportional-integral-derivative (PID) control module is implemented to provide resistive torque on the shaft of the EPS motor to prevent steering wheel position oscillations during a vehicle shutdown event.

Figure 2:
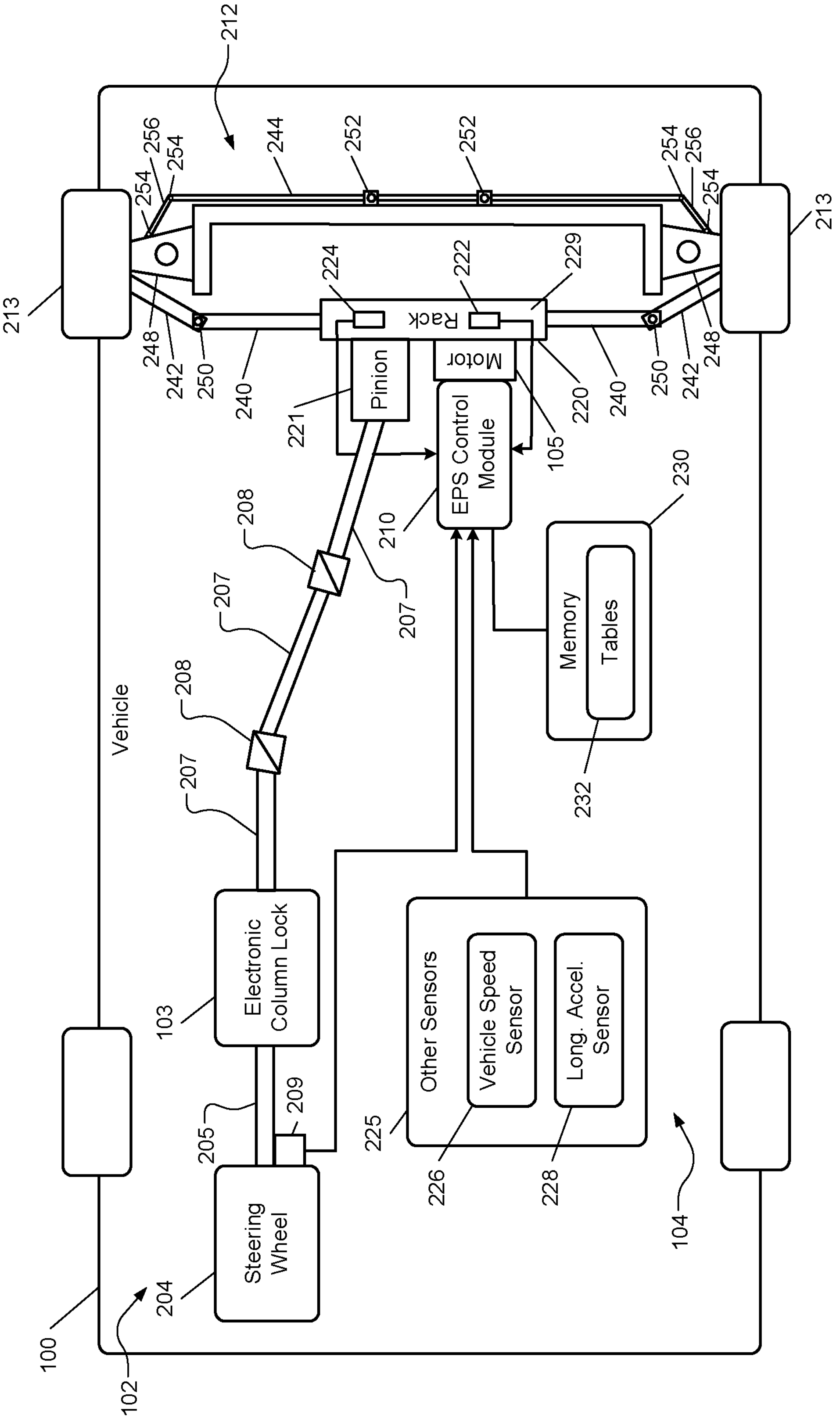
FIG. 2 is a functional block diagram of the vehicle of FIG. 1 illustrating further details of the EPS system.
Figure 4:
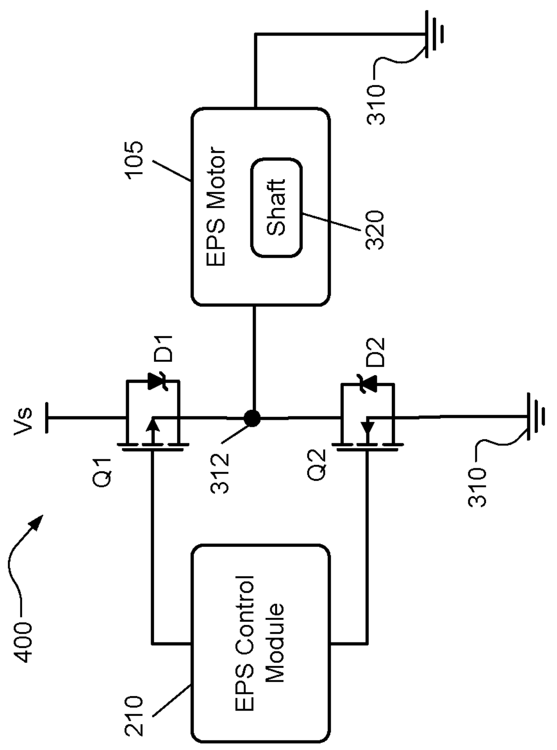
FIG. 4 is a schematic view of another example EPS control circuit including metal-oxide-semiconductor field-effect transistors (MOSFETs) in accordance with the present disclosure.
Figure 3:
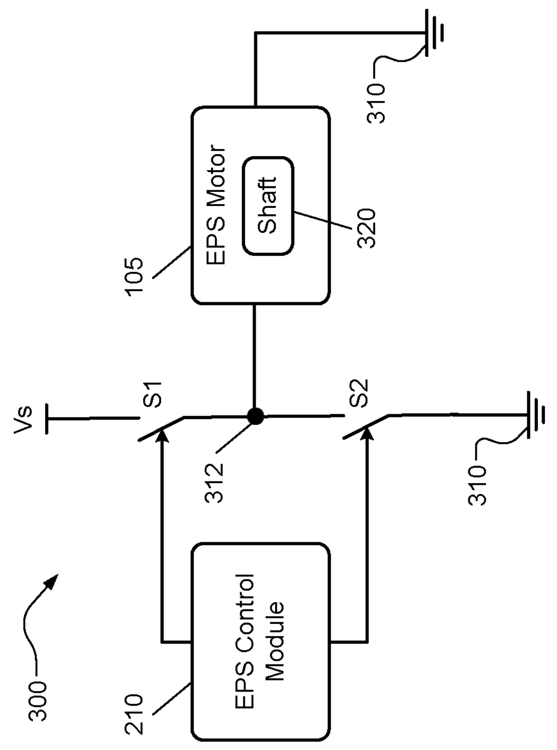
FIG. 3 is a schematic view of an example EPS control circuit in accordance with the present disclosure.

FIG. 1 shows a host vehicle 100 including an example EPS system 102. The EPS system 102 includes a column lock 103, an EPS control circuit 104, an EPS motor 105, a rack and pinion 106, and other components as shown in FIG. 2. The EPS control circuit 104 may include an EPS control module, switches, etc. for damping and preventing steering oscillation during a shutdown event. An example EPS control module is shown in FIGS. 2-4. In one embodiment, the EPS control module is implemented as a PID controller.

The host vehicle 100 may be a non-autonomous, partially autonomous, or fully autonomous vehicle. The host vehicle 100 may be a non-electric, hybrid or fully electric vehicle. The host vehicle 100 may include: a vehicle control module 107 for controlling operation of the host vehicle 100; a vision sensing (or perception) system 108 including object detection sensors 109; other sensors 110 (e.g., a driver door state sensor, seat sensors, occupant sensors, etc.); power source(s) 111; an infotainment module 112; and other control modules 113. The power sources 111 includes one or more battery packs (one battery pack 114 is shown) and a control circuit 115. The object detection sensors 109 may include cameras, radar sensors, lidar sensors, etc. The other sensors 109 may include temperature sensors, accelerometers, a gyroscope, a steering angle sensor, wheel speed sensors, a vehicle velocity sensor, and/or other sensors. The power sources 111 may include low-voltage power sources (e.g., 5V, 12V, or 48V power sources) and high-voltage power sources (e.g., 240-800V power sources) for powering low-voltage and high-voltage loads. The vehicle control module 107 may include a mode selection module 117, a parameter adjustment module 118, and a security module 121.

The modules 107, 112, 113, 117, 118, 121 and the EPS control module of the EPS system 102 may communicate with each other and have access to the memory 119 via one or more buses and/or network interfaces 120. The network interfaces 120 may include a controller area network (CAN) bus, a local interconnect network (LIN) bus, an Ethernet network interface, an auto network communication protocol bus, and/or other network bus.

The vehicle control module 107 controls operations of vehicle systems. The mode selection module 117 may select a vehicle operating mode. The parameter adjustment module 118 may be used to adjust, obtain and/or determine parameters of the host vehicle 100 based on, for example, signals from the sensors 109, 110 and/or other devices and modules referred to herein. The security module 121 may control and/or determine state of the electronic column lock 103. Although shown as part of the vehicle control module 107, the security module 121 may be separate from the vehicle control module 107.

The host vehicle 100 may further include the display 120, an audio system 122, and one or more transceivers 124. The display 120 and/or audio system 122 may be implemented along with the infotainment module 112 as part of an infotainment system.

The host vehicle 100 may further include a global positioning system (GPS) receiver 128 and a MAP module 129. The GPS receiver 128 may provide vehicle velocity and/or direction (or heading) of the vehicle and/or global clock timing information. The GPS receiver 128 may also provide vehicle location information including lane information. The MAP module 129 provides map information. The map information may include traffic control objects, routes being traveled, and/or routes to be traveled between starting locations (or origins) and destinations. The vision sensing system 108, the GPS receiver 128 and/or the MAP module 129 may be used to determine location of objects and position of the host vehicle 100 relative to the objects. This information may also be used to determine i) heading information of the host vehicle 100 and/or the objects, and ii) a relative speed of the host vehicle 100 relative to the objects.

The memory 119 may store sensor data 130, vehicle parameters 132, and applications 136. The applications 136 may include applications executed by the modules 107, 112, 113. Although the memory 119 and the vehicle control module 107 are shown as separate devices, the memory 119 and the vehicle control module 107 may be implemented as a single device. The memory 119 may be accessible to an electronic brake control module (EBCM) 139 of a brake control system 141 and/or the EPS control module.

The vehicle control module 107 may control operation of the EPS system 102 and a propulsion system 143 that may include an engine 144, a converter/generator 146, a transmission 148, and/or electric motors 160, as well as control operation of the brake control system 141. This control may be based on parameters set by the modules 107, 112, 113, 117, 118, 121 and the EPS control module. The vehicle control module 107 may set some of the vehicle parameters 132 based on signals received from the sensors 109, 110. The vehicle control module 107 may receive power from the power sources 111, which may be provided to the brake control system 141, the engine 144, the converter/generator 146, the transmission 148, the electric motors 160 and/or the EPS system 102, etc. Some of the vehicle control operations may include enabling fuel and spark (or ignition) of the engine 144, starting and running the electric motors 160, powering any of the systems 102, 141, 143, and/or performing other operations as are further described herein. The host vehicle 100 may include a start/stop switch (or button) 145, which may be in the form of an ignition switch.

The engine 144, the converter/generator 146, the transmission 148, the brake actuator system 158, the electric motors 160 and/or the EPS system 102 may include actuators controlled by the vehicle control module 107 to, for example, adjust fuel, spark, air flow, steering wheel angle, throttle position, pedal position, etc. This control may be based on the outputs of the sensors 109, 110, the GPS receiver 128, the MAP module 129 and the above-stated data and information stored in the memory 119. The vehicle control module 107 may determine various vehicle parameters including voltages, current levels, a vehicle speed, an engine speed, an engine torque, yaw angle, yaw rate, a gear state, an accelerometer position, a brake pedal position, an amount of regenerative (charge) power, understeer coefficient and/or value, oversteer coefficient and/or value, and/or other parameters. These parameters may be stored in the memory 119. The propulsion system 143 may also include one or more axles 164 including one or more differentials 166 of one or more axles 164 of the host vehicle 100.

As an example, the brake control system 141 may be implemented as a brake-by-wire system, such as an electromechanical braking system or an electro-hydraulic braking system. In an embodiment, the brake control system 141 may include the EBCM 139, a brake actuator 170 and a brake actuator sensor 172. The brake actuator 170 may include a traditional style brake pedal and/or other brake actuator, such as a handheld brake actuator. The brake actuator sensor 172 detects the position of the brake actuator 170, which is used to determine displacement of the brake actuator 170. The EBCM 139 may include a motor (or pump) and an electronic control module for controlling the operation of the motor. The motor may adjust brake pressure. The brake pressure may refer to pressure of a hydraulic fluid used to actuate brake pads. In an electromechanical configuration, the motor is not included.

FIG. 2 shows the host vehicle 100 of FIG. 1 illustrating further details of the EPS system 102. The EPS system 102 may include a steering wheel 204, a steering column 205, an electronic column lock 103, intermediate shafts 207, universal joints 208, a steering wheel sensor 209, an EPS control module 210, and a suspension system 212. The steering wheel 204 is used to steer front wheels 213. The EPS control module 210 controls the amount of power steering assistance provided and controls an amount of resistance and damping during vehicle shutdown events.

The steering wheel sensor 209 detects the rotational position of the steering wheel 204. A pinion 221 connects one of the intermediate shafts 207 to a steering rack 220. The EPS control module 210 controls position of the steering rack 220 via the EPS motor 105 based on the output of the steering wheel sensor 209, a force sensor 222, a steering rack position sensor 224, and/or output(s) from one or more other sensors 225, such as a vehicle speed sensor 226 and a longitudinal acceleration sensor (e.g., an accelerometer measuring longitudinal acceleration) 228. The position of the steering rack 220 refers to the positioning of tie rods 240, 242 relative to a body 229 of the steering rack 220. By adjusting the positions of the tie rods 240, 242, the road wheel angle of the wheels 213 changes. The body 229 is fixed to a frame of the host vehicle 100. One or more vehicle speed sensors may be included. One of the vehicle speed sensors may be onboard and directly measure vehicle speed. Vehicle speed may also be determined (or estimated) indirectly via, for example, a global positioning system. In one embodiment, the EPS control module 210 controls the position of the steering rack 220 based on outputs of the sensors 209, 222, 224, 226 and/or 228.

A memory 230 may be connected to the EPS control module 210 and store: tables 232, such as steering system damping calibration tables with steering system damping calibrations. These steering damping calibration tables may contain specific resistive torque values to output to the EPS motor that are dependent on vehicle speed, steering wheel angle gradient, driver mode control, steering column lock status, and vehicle shutdown state.

The suspension system 212 may be a front suspension system and include the steering rack 220, inner tie rods 240, outer tie rods 242, a sway bar 244, sway bar links 246, and control arms 248. The inner tie rods 240 may be connected to outer tie rods 242 via first bushings 250. The outer tie rods 242 may be connected to wheel assemblies via second bushings (not shown) to turn wheels 213. The sway bar 244 may be held by third bushings 252. The sway bar links 246 may be connected to the sway bar 244 and the control arms 248 via fourth bushings 254. Other bushings may exist, for example at the ends of the outer tie rods 242.

FIG. 3 shows an EPS control circuit 300, which is an example of the EPS control circuit 104 of FIG. 1. The EPS control circuit 300 includes the EPS control module 210, a first switch S1, a second switch S2, and the EPS motor 105. The switches S1, S2 are connected in series between a power source voltage terminal Vs and a ground reference terminal 310. The EPS control module 210 controls states of the switches S1, S2. The EPS motor 105 is connected to the ground reference terminal 310 and may have, for example, 6 phases. The EPS control circuit 300 may include a pair of switches configured similarly as the switches S1, S2 for each of the phases of the EPS motor 105. Thus, a total of twelve switches may be included, two for each phase. The switches of each pair of switches are connected in series between the power source terminal Vs and the ground reference terminal 310 and include an output terminal 312 between the switches. The output terminal 312 is connected to a respective one of the inputs (or phases) of the EPS motor 105.

During normal operation when steering assistance is provided, S1 is closed and S2 is open. During a shutdown event, S1 may be opened and S2 may be closed. This grounds the respective phase of the EPS motor 105. This may be down for each phase of the EPS motor 105. The grounding of the phases increases resistance to rotation of a shaft 320 of the EPS motor 105 and prevents the shaft 320 of the EPS motor 105 from rotating and thus prevents movement of the steering wheel 204 of FIG. 2. The switches S1, S2 may be implemented as MOSFETs, relays (e.g., single pole relays, or double throw (SPDT) relays), and/or other switches. A MOSFET example is shown in FIG. 4. As an example, when the phases of the EPS motor 105 are shorted to the ground reference terminal 312, there is increased resistance to rotation of the shaft 320, which can result in 20 times motor resistance to rotation in a corresponding steering wheel.

FIG. 4 shows an EPS control circuit 400, which is another example of the EPS control circuit 104 of FIG. 1, where the switches S1, S2 of FIG. 3 are implemented as MOSFETs Q1, Q2. Q1 may be implemented as a p-channel MOSFET and Q2 may be implemented as an n-channel MOSFET, as shown. Diodes D1, D2 may be connected between sources and drains of the MOSFETS Q1, Q2. In the example shown, the anode of D1 is connected to the drain of Q1, the cathode of D1 is connected to the source of Q1, the cathode of D2 is connected to the drain of Q2, and the anode of D2 is connected to the source of Q2. As with S1, S2 of FIG. 3, during normal operation when steering assistance is provided, Q1 is closed and Q2 is open. During a shutdown event, Q1 may be opened and Q2 may be closed. The EPS control module 210 may generate and provide pulse width modulation (PWM) signals to the MOSFETs Q1, Q2 to control states of the MOSFETs Q1, Q2 this includes providing damping control of the rack 220 of FIG. 2 and/or shorting the EPS motor 105 to ground.

Figure 5:
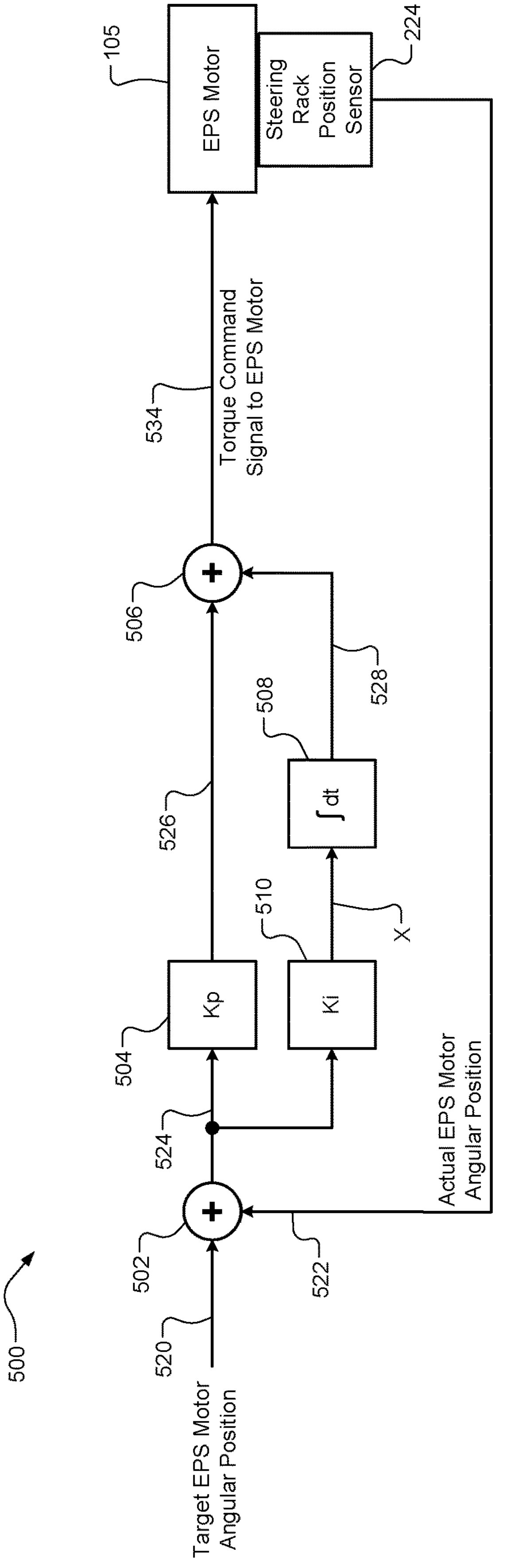
FIG. 5 is a functional block diagram of an example proportional-integral-derivative (PID) control circuit implemented by an EPS control module in accordance with the present disclosure.

FIG. 5 shows a PID control circuit 500 that may be implemented by the EPS control module 210 of FIG. 2. The PID control circuit 500 includes a first summer 502, a proportional gain factor module 504 applying a gain factor Kp, a second summer 506, a derivative module 508, and an integral gain factor module 510 applying a gain factor Ki. The first summer 502 sums a target EPS motor angular position 520 and a measured (or actual) EPS motor angular position 522 to provide an error 524. The proportional gain factor module 504 applies the gain factor Kp to provide a proportional term 526, which is summed by the second summer 506 with a derivative term 528 provided by the derivative module 508. The integral gain factor module 510 generates an integral term 530 based on the error 524. The second summer 506 outputs a torque commend signal 534 to the EPS motor 105. The steering rack position sensor 224 detects position of the shaft 320 (shown in FIGS. 3-4) of the EPS motor 105 and generates the measured EPS motor angular position signal 522. In an embodiment, the EPS control module generates the torque commend signal 534 to ensure zero error between the signals 520, 522.

Figure 6:
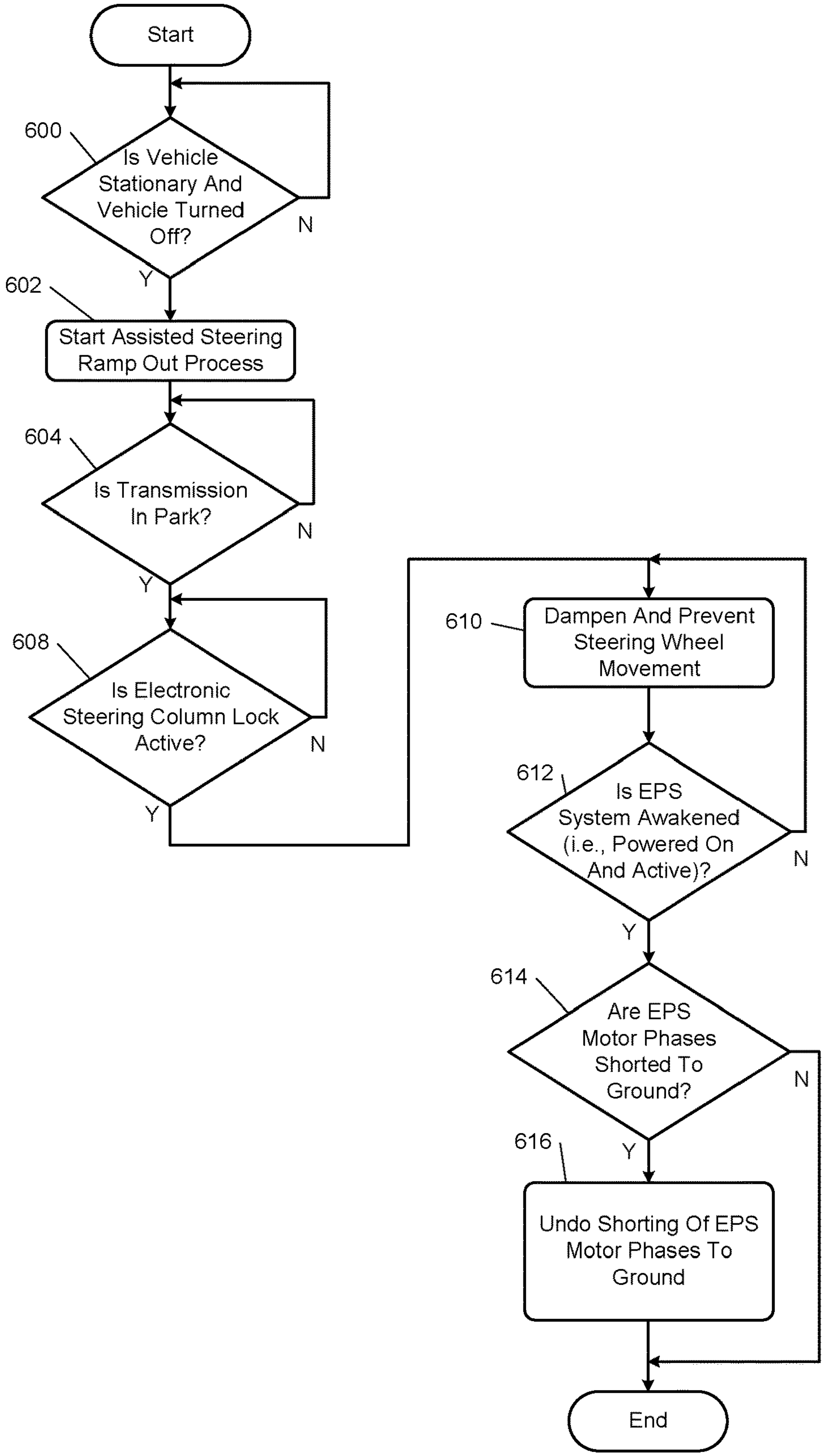
FIG. 6 illustrates a method of damping and preventing steering wheel oscillation during vehicle shutdown in accordance with the present disclosure.

FIG. 6 shows a method of damping and preventing steering wheel oscillation during vehicle shutdown. The method may be implemented during each shutdown event and restart event. The method may be implemented by the EPS control circuit 104 and the EPS control module 210 of FIGS. 1-4.

At 600, the EPS control module 210 determines whether the vehicle is stationary and is turned off. This may be determined via a vehicle speed sensor, an ignition switch, and/or a driver door state sensor. The driver door state sensor indicates whether the driver door is open or closed. When the driver door is opened, the vehicle control module 107 may turn the host vehicle 100 off. This may include powering down electronics. When the ignition switch is switched off, the ignition system of the host vehicle 100 is disabled and vehicle electronics are powered down. When the vehicle is stationary and turned off, operation 602 is performed.

At 602, the EPS control module 210 starts assisted steering ramp down process to gradually decrease the amount of power steering assistance provided. This includes decreasing the amount of torque output by the EPS motor 105.

At 604, the EPS control module 210 determines whether the transmission 148 is in a parked state. If yes, operation 608 is performed.

At 608, the EPS control module 210 receives a signal whether the electronic steering column lock is active. If yes operation 610 is performed, otherwise operation 606 may be performed. The EPS control module 210 may receive the signal from, for example, a security module that determines the status of the electronic column lock 103. When the vehicle is stationary and turned OFF and the transmission is in park, the security module may lock the steering the steering column by sending a signal to the electronic column lock 103 to lock the steering column 205 to the intermediate shafts 207 and thus to the rack 220. This may include, for example, actuating and engaging a pin within the electronic column lock 103.

At 610, the EPS control module 210 dampens and prevents movement of the steering wheel 204. This may include changing states of the switches S1, S2 of FIG. 3, changing states of the MOSFETS Q1, Q2 of FIG. 4, introducing a damping force by applying a countering torque via the EPS motor 105, and/or providing damping control via PID control, as described above. In an embodiment, the EPS control module 210 detects movement of the shaft of the EPS motor 105 and applies a resistive torque to prevent movement of the shaft. In an embodiment, the EPS control module 210 measures position and and/or velocity of the shaft of the EPS motor 105 and applies torque in an opposite direction to counter and thus cancel the motion of the shaft. In another embodiment, the EPS control module 210 provides damping PID control including resistive torque to dampen and prevent movement of the shaft. In an embodiment, the EPS control module 210 ceases damping and increasing resistance to movement of the steering wheel 204, when the assisted steering ramp out process has completed.

At 612, the EPS control module 210 determines whether the EPS system 102 is awakened (i.e., powered on and active) to provide assisted steering. This may occur, for example, when the ignition is switched on and/or when the driver door is open and closed and a driver is in the driver seat. A seat sensor and/or occupant sensor (e.g., interior camera) may be used to detect whether there is a driver in the driver seat. If yes, operation 614 is performed, otherwise operation 610 is performed.

At 614, the EPS control module 210 determines whether phases of the EPS motor 105 are shorted to ground (e.g., S1 is open and S2 is closed). If yes, operation 616 is performed, otherwise the method may end.

At 616, the EPS control module 210 ceases shorting EPS motor phases to ground. This may include closing S1 and opening S2 for each phase of the EPS motor 105.

The examples set forth herein include a system and algorithms that facilitate detection of certain vehicle conditions during vehicle shutdown and determine when to control a steering system (e.g., a front steering system). A method is disclosed that uses switches (e.g., MOSFETs, relays (e.g., single pole relays, or double throw (SPDT) relays), etc.) to hold the front steering rack actuator in its current position by disconnecting the power source from an EPS motor including shorting phases of the EPS motor to ground. Another method is disclosed and includes utilizing a unique steering damping function to resist and restrain any undesired movement of the front steering actuator during vehicle shutdown and steering assist ramp out processes. Another method is disclosed that includes a PID control module controlling and preventing momentary oscillations during vehicle shutdown of an EPS motor and thus preventing momentary oscillations of the corresponding steering wheel.

The examples disclosed herein include holding a steering wheel in a position after turning a vehicle off (e.g., ignition off, start/stop button off, opening a driver door, etc.). This allows a driver to use a steering wheel for support to exit the vehicle without having to wait for steering assist to completely ramp out after the vehicle is turned off. The examples prevent momentary steering wheel oscillations during vehicle shutdown that can cause disturbance to the driver.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An electronic power steering system comprising:

a steering wheel configured to steer a host vehicle;

a steering column connected to the steering wheel;

a rack;

an electronic column lock configured to lock the steering column to the rack;

an electronic power steering wheel motor separate from the electronic column lock and configured to perform steering assistance; and a control module configured, during a shutdown event of the host vehicle, to determine whether the electronic column lock is active and has locked the steering column to the rack, and, in response to determining that the steering column is locked to the rack, dampen movement of the steering wheel to prevent movement of the steering wheel, wherein the movement of the steering wheel, when the steering column is locked to the rack via the electronic column lock, is associated with play between the steering wheel and the rack, and the control module is configured to prevent oscillation in the steering wheel when the steering wheel is bumped during the shutdown event by dampening via the electronic power steering wheel motor the movement of the steering wheel during shutdown of the steering assistance.

2. The electronic power steering system of claim 1, wherein the control module is configured, during the shutdown event of the host vehicle, to determine whether the host vehicle is stationary and whether the host vehicle is turned off, and, based on the host vehicle being stationary and being turned off, dampen movement of the steering wheel.

3. The electronic power steering system of claim 1, wherein the control module is configured, during the shutdown event of the host vehicle, to determine whether the host vehicle is in a parked state, and, based on the host vehicle being in a parked state, dampen movement of the steering wheel.

4. The electronic power steering system of claim 1, wherein the control module is configured, while damping movement of the steering wheel, to short phases of the electronic power steering system motor of the host vehicle to a ground reference terminal.

5. The electronic power steering system of claim 4, further comprising the electronic power steering system motor, wherein the control module is configured to, in response to determining that the steering column is locked to the rack, dampen movement of a shaft of the electronic power steering motor including increasing resistance to prevent movement of the shaft.

6. The electronic power steering system of claim 4, further comprising an electronic power steering control circuit comprising a first switch and a second switch, wherein:

the first switch and the second switch are connected in series between a power source terminal and the ground reference terminal;

a terminal between the first switch and the second switch supplies power to the electronic power steering system motor; and the control module is configured, while damping movement of the steering wheel, to open the first switch and close the second switch, and to perform pulse width modulation control of the first switch and the second switch and periodically short to ground phases of the electronic power steering system motor to dampen movement of the steering wheel.

7. The electronic power steering system of claim 6, wherein the control module is configured to i) determine that the host vehicle is in a driving mode, and ii) transmit a command to the electronic power steering control circuit to electrically couple each of a plurality of phases of the electronic power steering system motor to a power source to free the steering wheel including changing states of the first switch and the second switch.

8. The electronic power steering system of claim 6, wherein the first switch and the second switch are implemented as metal-oxide-semiconductor field-effect transistors or relays.

9. The electronic power steering system of claim 1, wherein the control module is configured, while damping movement of the steering wheel, to control the electronic power steering system motor to apply a torque that counters and cancels motion of the steering wheel thereby preventing motion of the steering wheel.

10. The electronic power steering system of claim 1, wherein the control module is configured, while damping movement of the steering wheel, to implement a steering damping function to resist and restrain movement of a shaft of the electronic power steering motor.

11. The electronic power steering system of claim 1, wherein the control module is configured, while damping movement of the steering wheel, to command motor torque to match a target motor torque to minimize or eliminate error between the commanded motor torque and the target motor torque.

12. The electronic power steering system of claim 11, wherein the control module is configured to implement a proportional-integral-derivative process to generate the commanded motor torque.

13. An electronic power steering system method for a host vehicle, wherein the host vehicle comprises a steering wheel, a steering column connected to the steering wheel, a rack, and an electronic column lock configured to lock the steering column to the rack, the method comprising:

during a shutdown event of the host vehicle, determining whether the electronic column lock is active and has locked the steering column to the rack;

in response to determining that the steering column is locked to the rack, damping movement of the steering wheel to prevent movement of the steering wheel;

while damping movement of the steering wheel, shorting phases of an electronic power steering system motor of the host vehicle to a ground reference terminal;

supplying power to the electronic power steering system motor via a first switch and a second switch, wherein the first switch and the second switch are connected in series between a power source terminal and the ground reference terminal, and wherein a terminal between the first switch and the second switch supplies power to the electronic power steering system motor;

while damping movement of the steering wheel, opening the first switch and closing the second switch; and performing pulse width modulation control of the first switch and the second switch and periodically shorting to ground phases of the electronic power steering system motor to dampen movement of the steering wheel.

14. The method of claim 13, further comprising:

during the shutdown event of the host vehicle, determining whether the host vehicle is stationary and whether the host vehicle is turned off; and based on the host vehicle being stationary and being turned off, damping movement of the steering wheel.

15. The method of claim 13, further comprising:

during the shutdown event of the host vehicle, determining whether the host vehicle is in a parked state; and based on the host vehicle being in a parked state, damping movement of the steering wheel.

16. The method of claim 13, further comprising, while damping movement of the steering wheel, controlling the electronic power steering system motor to apply a torque that counters and cancels motion of the steering wheel thereby preventing motion of the steering wheel.

17. The method of claim 13, further comprising:

while damping movement of the steering wheel, commanding motor torque to match a target motor torque to minimize or eliminate error between the commanded motor torque and the target motor torque; and implementing a proportional-integral-derivative process to generate the commanded motor torque.

18. An electronic power steering system comprising:

a steering wheel configured to steer a host vehicle;

a steering column connected to the steering wheel;

a rack;

an electronic column lock configured to lock the steering column to the rack;

an electronic power steering wheel motor separate from the electronic column lock and configured to perform steering assistance; and a control module configured, during a shutdown event of the host vehicle, to determine whether the electronic column lock is active and has locked the steering column to the rack, and, in response to determining that the steering column is locked to the rack, dampen movement of the steering wheel to prevent movement of the steering wheel, wherein the shutdown event includes a ramp out process for the steering assistance, and the control module is configured to dampen movement of the steering wheel during the ramp out process, which includes ramping down the steering assistance from 100% to 0% and reducing torque output of the electronic power steering wheel motor.

* * * * *